(12) United States Patent
Volz

(10) Patent No.: US 6,587,325 B1
(45) Date of Patent: Jul. 1, 2003

(54) EQUIPMENT LOAD SAFETY CIRCUIT

(75) Inventor: Kenneth C. Volz, West Monroe, NY (US)

(73) Assignee: Entrelec-SSAC, Inc., Baldwinsville, NY (US)

( * ) Notice: Subject to any disclaimer, the term of this patent is extended or adjusted under 35 U.S.C. 154(b) by 145 days.

(21) Appl. No.: 09/752,340

(22) Filed: Dec. 29, 2000

(51) Int. Cl.[7] .......................... H01H 47/32; H01H 47/00
(52) U.S. Cl. ...................................................... 361/155
(58) Field of Search ................................ 361/155, 113, 361/115

(56) References Cited

U.S. PATENT DOCUMENTS

| | | | | |
|---|---|---|---|---|
| 4,447,846 A | * | 5/1984 | McCleery | 361/90 |
| 4,466,040 A | * | 8/1984 | Barthel et al. | 361/92 |
| 4,853,821 A | * | 8/1989 | Lewis | 361/92 |
| 4,894,745 A | * | 1/1990 | Akagawa et al. | 361/42 |
| 6,208,042 B1 | * | 3/2001 | Solis | 307/125 |

* cited by examiner

Primary Examiner—Brian Sircus
Assistant Examiner—Z Kitov
(74) Attorney, Agent, or Firm—Wall, Marjama & Bilinski LLP

(57) ABSTRACT

A safety circuit according to the invention controls operation of an equipment load. A manual control switch of the safety circuit is connected in series with the equipment load for controlling the flow of electrical current to the equipment load. The equipment load and control switch series combination are further in communication with a relay contact switch of the safety circuit, which, like the manual control switch controls the flow of electrical current to the equipment load. Arranged in this configuration the equipment load operates only if both the mechanical switch and relay contact are closed. If either the manual control switch or the relay contact are open, the equipment load does not operate.

51 Claims, 2 Drawing Sheets

EQUIPMENT LOAD SAFETY CIRCUIT

BACKGROUND OF THE INVENTION

The present invention relates to safety devices in general, and in particular to an electrical load safety circuit.

BACKGROUND OF THE PRIOR ART

Industrial machines such as power saws and drills pose a major safety threat in the event of an electrical power outage. When a power outage occurs, it is difficult to maintain records as to whether a machine was or was not operating at the time the outage commenced. Accordingly, machines set to an "on" position during an outage are often mistakenly believed to be set to an "off" position. These machines commonly cause harm to equipment being worked on and workers themselves when power is unexpectedly regained.

To counteract this problem, industrial machines are sometimes equipped with a "safety circuit" which assure that a circuit is set to an "off" position when power is lost. These safety circuits generally include sensing circuitry in communication with a control switch. The sensing circuitry senses when power is lost and trips the control switch to the "off" position when there is a loss of power. Thus, for the machine to be turned back "on" after a power failure, the control switch of the machine must be manually set to an "on" position.

The inventor has found that commercially available safety circuits are unnecessarily complex, requiring an unnecessarily large number of circuit components at unnecessarily high costs. The safety circuit described in U.S. Pat. No. 3,958,164, for example, includes two relay-coils controlling three relay contacts, and four mechanical switches. Other known safety circuits include complex and relatively expensive solid state devices for sensing power losses and for tripping control switches.

In addition, while prior art safety circuits require that control switches be manually moved to an "on" position after a power failure, they are still susceptible to problems resulting from a control switch being accidently or mistakenly m moved to an "on" position after a power failure but before power is regained. If a machine control switch protected with a prior art safety circuit is mistakenly set to an "on" position after a power failure but before power is regained, the machine protected by the prior art safety circuit poses the same safety hazard in the event of an unexpected power regain as a machine not protected by any safety circuit.

There is a need for lower cost equipment load safety circuit comprising a reduced number of circuit components.

SUMMARY OF THE INVENTION

According to its major aspects and broadly stated, the present invention is a low cost equipment load safety circuit comprising a limited number of circuit components.

A safety circuit according to the invention controls operation of an equipment load. A manual control switch of the safety circuit is connected in series with the equipment load for controlling the flow of electrical current to the equipment load. The equipment load and control switch series combination are further in communication with a relay contact switch of the safety circuit, which, like the manual control switch controls the flow of electrical current to the equipment load. Arranged in this configuration the equipment load operates only if both the mechanical switch and relay contact are closed. If either the manual control switch or the relay contact are open, the equipment load does not operate.

In further aspects of the invention, the relay contact is controlled by a relay inductor coil which is arranged in the safety circuit so that the relay contact opens only if there is a loss of electrical power and closes only if electrical power is available and both the relay contact and the switch is open. Therefore, an opening and closing of the control switch prior to a power regain will not result in the relay contact closing. This safety feature prevents in all cases the immediate operation of the equipment load on the unexpected regaining of power, even where the manual control switch is mistakenly or accidently opened and closed prior to a power regain. According to the invention, an opened control switch (which may be opened prior to or after a power regain) must be manually closed subsequent to a power regain for an equipment load to operate.

The drop-out and pull-in voltages of the circuit relay are carefully selected to assure proper circuit operation. The drop-out voltage of the relay is established, and the circuit complementally arranged so that the voltage across the relay coils falls below the drop-out voltage only if there is a complete loss of electrical power. The pull-in voltage of the relay is established and circuit complementally arranged so that the voltage across the relay coil exceeds the pull-in voltage only if the control switch is open and electrical power is available. This assures that operating power can only be supplied to the equipment load if the control switch is actuated (either opened and closed or closed from an open position) subsequent to a power regain.

In a preferred embodiment of the invention, the safety circuit includes a capacitor properly sized and arranged in the circuit such that the capacitor in combination with the relay inductor coil form a series circuit operating at about the series resonant frequency of the circuit when the control switch and relay contact are open. With this design, the voltage across the relay coil is assured of reaching a level substantially higher with the control switch open and the relay contact open than with the manual switch closed and the relay contact open. Providing a relay coil inductor voltage that is substantially higher with the manual switch and relay contact open than with the manual switch closed and contact open allows the pull-in voltage of the relay to be selected within a wide margin of error, and allows the selection of a pull-in voltage that is substantially spaced apart from both the maximum and minimum voltage drops across the relay coil, thereby enhancing the circuit's performance reliability.

These and other details, advantages and benefits of the present invention will become apparent from the detailed description of the preferred embodiment herein below.

BRIEF DESCRIPTION OF THE DRAWING

For a further understanding of these and objects of the invention, reference will be made to the following detailed description of the invention which is to be read in connection with the accompanying drawing, wherein.

DETAILED DESCRIPTION OF THE INVENTION

Figure 1:
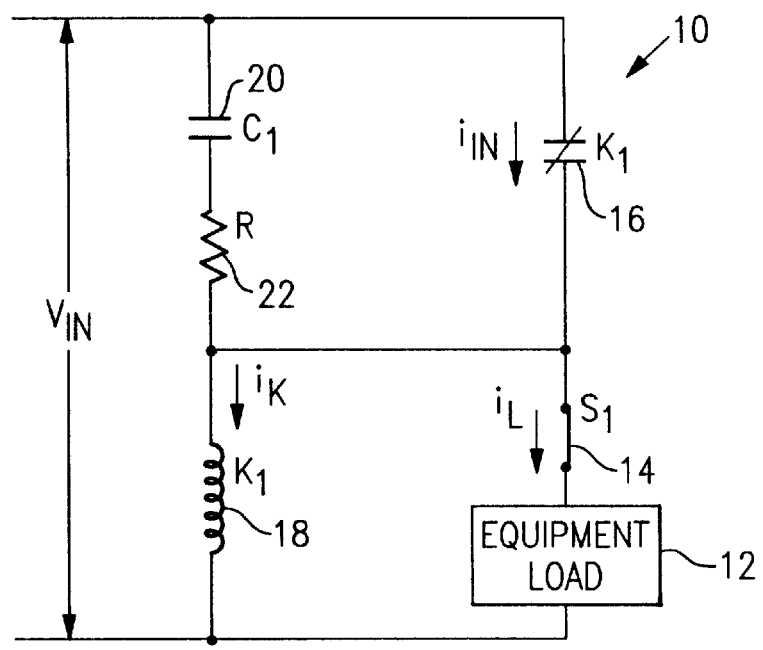
FIG. 1 illustrates operation of an exemplary embodiment of the invention when an equipment load is supplied with electrical power.
Figure 2:
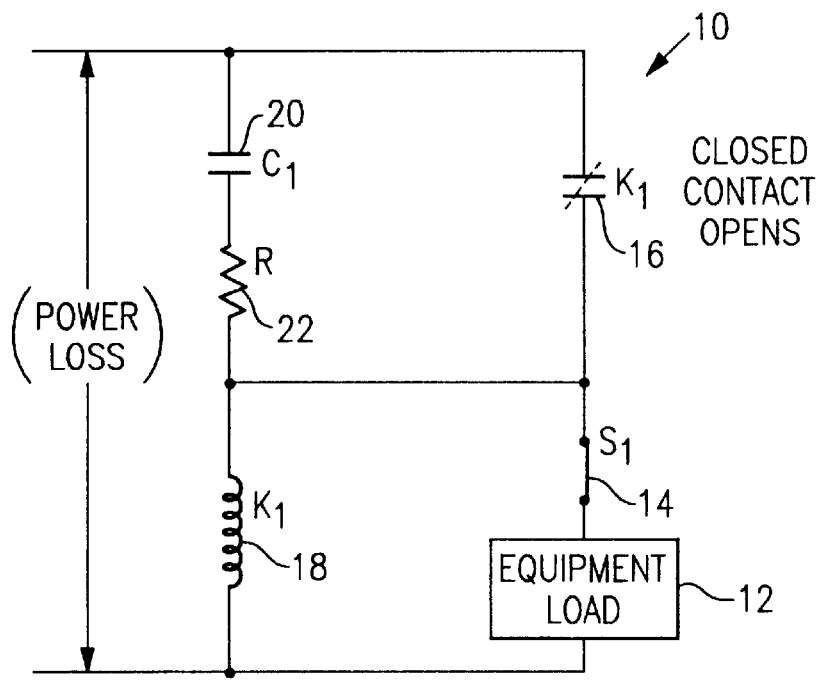
FIG. 2 illustrates operation of a circuit according to the invention during a power loss.
Figure 3:
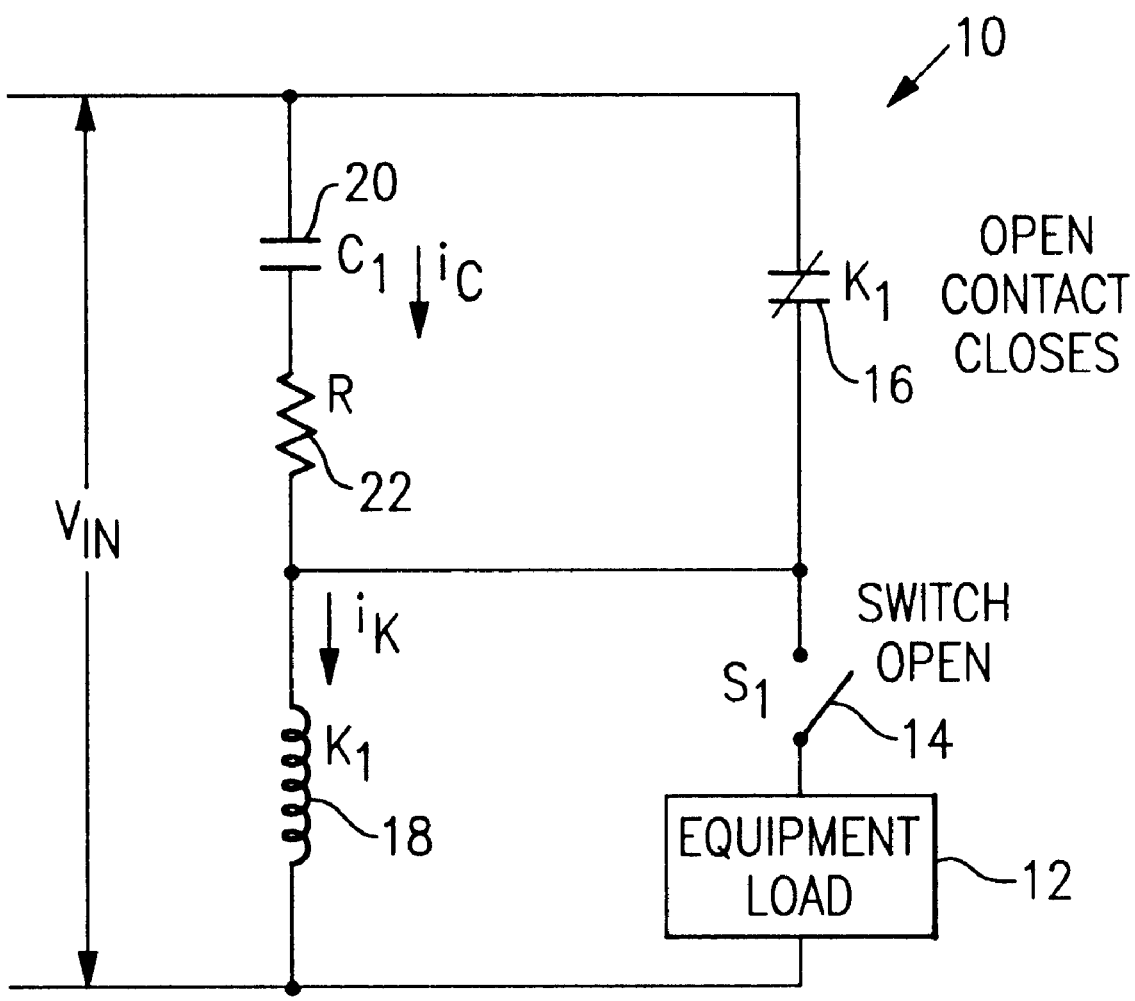
FIG. 3 illustrates an operation of a circuit according to the invention when power is regained subsequent to a power loss.

An exemplary embodiment of the invention is described with reference to FIGS. 1, 2, and 3 illustrating various operating states of the circuit. Safety circuit 10 controls the operation of an equipment load 12 that is connected in the series with a manual control switch 14 controlling the flow of electrical current to the equipment load. The equipment loss 12 and control switch 14 series combination are further in communication with a relay contact 16, which, like manual control switch 14 controls the flow of electrical current to the equipment load 12. Arranged in this configuration the equipment load operates only if both control switch 14 and relay contact 16 are closed and electrical power is available. If either the manual control switch 14 or the relay contact 16 are open, the equipment load does not operate. Control switch 14 may be any mechanical, electrical or electro-mechanical local or remote switching device actuated by the action of an operator.

In further aspects of the invention, the opening and closing of relay contact 16 is controlled by a relay inductor coil 18 which is arranged in the safety circuit so that the relay contact 16 opens only if there is a loss of electrical power, and closes only on the condition that electrical power is available and both relay contact 16 and switch 14 are open. Therefore, an opening and closing of the control switch 14 subsequent to a power failure but prior to a power regain will not result in the closing of relay contact 16. Further, a power regain with switch 14 closed will not result in relay contact 16 closing until switch 14 is opened. This safety feature prevents in all cases the immediate operation of the equipment operation on the unexpected regaining of power, even where the manual control switch is mistakenly or accidently opened and closed prior to a power regain. According to the invention, an opened manual switch (which may be opened prior to or after a power regain) must be manually closed subsequent to a power regain for an equipment load to operate.

The drop out and pull-in voltages of the circuit relay comprising coil 18 and contact 16 are carefully selected to assure proper circuit operation "drop out voltage" as used herein refers to a maximum voltage which allows a relay to depart from pickup. "Pull-in voltage" as used herein refers to a minimum inductor coil voltage which allows a relay to reach a pickup state from reset. The circuit arrangement and relay drop out voltage are selected complementarily so that the voltage across the relay inductor coil 18 falls below the drop-out voltage only if there is a complete loss of electrical power. In addition, the circuit arrangement and relay pull-in voltage are selected complementarily so that the voltage across the relay inductor coil 18 exceeds the pull-in voltage only if the manual switch 14 is open and electrical power is available. This assures that operating power can only be supplied to the equipment load if the manual switch is actuated (either opened and closed or closed form an open position) subsequent to a power regain.

In a preferred embodiment of the invention, the safety circuit 10 includes a capacitor 20 properly sized and arranged in the circuit such that the capacitor 20 in combination with the inductor coil 18 form a series circuit operating at about the series resonant frequency of the circuit when the manual switch and relay contact are open. With this design, the voltage across the relay inductor coil 18 is assured of reaching a level substantially higher with the manual switch open and the relay contact open than with the manual switch closed and the relay contact open. Providing a relay coil inductor voltage that is substantially higher with the manual switch and relay contact open than with the manual switch closed and contact open allows the pull-in voltage of the relay to be selected within a wide margin of error, and allows the selection of a pull-in voltage that is substantially spaced apart from both the maximum and minimum voltage drops across the relay coil, thereby enhancing the circuit's performance reliability.

More specific features of an exemplary circuit of the present invention will now be described with specific reference to FIGS. 1, 2, and 3 illustrating various operating states of the circuit. Circuit 10 includes a relay contact 16 connected in parallel with a series connected capacitor 20 and resistor 22, connected in turn, in series with a circuit combination of relay inductor coil 18 connected in parallel with a series connected switch 14 and equipment load 12.

A first operating state of circuit 10 is illustrated by FIG. 1. When circuit 10 supplies operating power to an equipment load, relay contact 16 is closed and the input current is divided between inductor coil 18 and equipment load 12. In this operating state, then the voltage across relay inductor coil 18 remains above the established drop-out voltage of relay inductor coil 18 such that relay contact 16 remains closed.

FIG. 2 illustrates the circuit in operation during a power loss. The drop out voltage of relay inductor coil 18 is established so that the voltage across relay inductor coil 18 falls below the established drop-out voltage only if there is a loss of supply power. When there is a power loss, as is illustrated in FIG. 2, the voltage across coil 18 falls below the drop-out voltage so that relay contact 16 opens. A subsequent regaining of supply power with contact 16 open and switch 14 closed will not be effective to operate equipment load 12. More specifically, in a further aspect of the invention, the pull-in voltage, $V_{p1}$ of coil inductor 18 is selected to be a value above the voltage $V_{k1}$, across the coil inductor with contact 16 open and switch 14 closed. Therefore, a subsequent regaining of power with contact 16 open and switch 14 closed will not result in the voltage across relay inductor coil 18 exceeding the pull-in voltage.

An operating state in which voltage across relay inductor coil 18 exceeds the pull-in voltage, $V_{p1}$ of coil is shown in FIG. 3. It is seen that when switch 14 is open with contact 16 open, the capacitor 20, resistor 22 and inductor coil 18 form a series connected circuit in which the components share a common current. According to a preferred embodiment of the invention, capacitor 20, resistor 22 and inductor coil 18 are sized so that these components exhibit series resonance when they operate as a series connected circuit at the frequency of the supply voltage.

The components of the series resonant circuit can be selected to approximately satisfy the series-resonance formula.

$$f_r = \frac{1}{2\pi\sqrt{LC}} \qquad \text{Equation 1}$$

where [fr] $f_r$ is the frequency of the supply voltage, typically 50 Hz or 60 Hz.

The current through a series connected LCR circuit is at a maximum when the circuit operates at its series resonant frequency. It is seen therefore than the voltage across relay coil 18 is maximized when capacitor 20, resistor 22 and inductor coil 18 form a series tuned circuit operating at the circuit's series resonant frequency.

Selecting the values of capacitor 20 and inductor coil 18 so that capacitor 20, resistor 22 and inductor coil 18 form a series resonant circuit at the supply voltage frequency simplifies the task of establishing a pull-in voltage for relay coil. The pull-in voltage of relay coil 18 must be established so that the pull-in voltage is greater than the voltage, $V_{k1}$ across inductor coil 18 when contact 16 is open and switch 14 is closed but less than the voltage $V_{k2}$ across relay inductor coil 18 when contact 16 is open and switch 14 is open. Maximizing the difference between these two voltages, $V_{k1}$ and $V_{k2}$, allows a greater range of possible pull-in voltages, and therefore allows the selection of a pull-in voltage to be made with a greater margin for error. Maximizing the difference between $V_{k2}$ and $V_{k1}$ also enables a selection of a pull-in value that is substantially spaced apart in voltage level from both $V_{k1}$ and $V_{k2}$, thereby enhancing the reliability of the circuit's performance. The difference between $V_{k1}$ and $V_{k2}$ is maximized when capacitor 20, resistor 22 and inductor coil 18 form a series resonant circuit with switch 14 and contact 16 open.

While selecting values for capacitor 20 and inductor 18 so that the circuit operates in series resonance when switch 14 is open maximizes the difference between $V_{k2}$ and $V_{k1}$ it will be understood that the circuit will be operational provided $V_{k1}$ is less than $V_{k2}$ and the pull-in voltage, $V_{p1}$, is selected to be a voltage there between. In general, a pull-in voltage value between the values $V_{k1}$ and $V_{k2}$ can readily be established by selecting circuit component values so that the circuit formed by the series connected capacitor 20, resistor 22 and inductor coil 18 with switch 14 open have a resonant frequency closer to the operating frequency than that of the circuit formed by capacitor 20, resistor 22, inductor 18 and load 12 with switch 14 closed.

Referring to further aspects of the operating state illustrated by FIG. 3, it is seen that relay contact 16 will close as soon as the voltage across relay coil 18 exceeds the pull-in value. When switch 14 is subsequently closed, circuit 10 will resume operating in the equipment operation operating state described with reference to FIG. 1. With contact 16 and switch 14 closed, the voltage across relay coil 18 will drop to a level less than its level with contact 16 and switch 14 open. Accordingly, it is seen that drop-out voltage of inductor coil 18 must be selected to be less than the voltage across inductor coil 18 with contact 15 and switch 14 closed so that contact 15 does not erroneously open when the circuit operates in an equipment operation mode.

While this invention has been described in detail with reference to a preferred embodiment, it should be appreciated that the present invention is not limited to that precise embodiment. Rather, in view of the present disclosure which describes the best mode for practicing the invention, many modifications and variations would present themselves to those skilled in the art without departing from the scope and spirit of this invention, as defined in the following claims:

What is claimed is:

1. A safety circuit for controlling operating of an equipment load, said safety circuit comprising:
   a control switch connected in series with said equipment load controlling a flow of electrical current to said equipment load;
   a relay contact in communication with said series connected control switch. also controlling a flow of current to said load, said load being operational only if said switch and said contact are closed to allow current to flow to said equipment load;
   a capacitor; and
   a relay inductor coil controlling operation of said relay contact,
   wherein said capacitor and inductor are selected so that said capacitor and said inductor form a series connected circuit operating at about a resonant frequency when said switch and said relay contact are open.

2. The circuit of claim 1, wherein a drop-out voltage of said relay inductor coil is established and said circuit is configured so that a voltage across said relay inductor coil falls below said drop-out voltage only when there is a loss of supply power.

3. The circuit of claim 1, wherein said circuit is configured and a pull-in voltage of said relay inductor coil is established so that a voltage across said relay inductor coil exceeds said pull-in voltage only when said control switch and said contact are open and supply power is available, whereby said equipment load can be operated only if said switch is closed from an open position or open and then closed subsequent to a regain of supply power.

4. The circuit of claim 1, wherein said circuit is configured so that said contact opens when there is a loss of supply power and further wherein said circuit is configured so that a voltage across said relay inductor coil is greater when said relay contact and said control switch are open than when said switch is closed and said contact is open, and wherein a pull-in voltage of said relay coils is established between a maximum and minimum value of said inductor coil voltage, whereby said relay contact closes to allow operation of said equipment article only if said control switch is closed from an open position or open and then closed subsequent to a regaining of supply power.

5. A safety circuit for controlling operation of an electrical load subsequent to a loss of supply power, said safety circuit comprising:
   a capacitor connected in parallel with a relay contact;
   a control switch connected in series with said equipment load; and
   a relay inductor coil controlling the opening and closing of said relay contact, said relay inductor coil connected in parallel with said series-connected control switch and equipment load combination, wherein said parallel connected combination of said relay inductor coil and said series connected load and switch is connected in series with said parallel connected combination of said capacitor and said relay contact, wherein said supply power is applied across said circuit so that said equipment load is operational only if said relay contact and said switch contact are closed.

6. The circuit of claim 5, wherein said circuit is configured to prevent substantial current from flowing to said equipment load when said relay contact is open and said control switch is closed.

7. The circuit of claim 5, wherein said circuit is configured and a drop-out voltage of said relay is selected so that a voltage across said relay coil falls below said drop-out voltage only if there is a loss of supply power.

8. The circuit of claim 5, wherein said circuit is configured and a drop-out voltage of said relay inductor coil is selected so that a voltage across said relay coil falls below said drop-out voltage only if there is a loss of supply power, and wherein said circuit is configured so that voltage across said relay inductor coil increases above a pull-in value of said coil when said manual switch is opened subsequent to a power regain.

9. The circuit of claim 5, wherein said circuit is configured so that said contact opens when there is a loss of supply power, and further wherein said circuit is configured and a pull-in voltage of said relay inductor coil is established so that a voltage across said relay inductor coil exceeds said pull-in voltage only when said control switch and said contact are open and supply power is available, whereby said equipment load can be operated only if said switch is closed from an open position or open and then closed subsequent to a regaining of supply power.

10. The circuit of claim 5, wherein said capacitor and inductor are selected so that said capacitor and said inductor form a series connected circuit operating at about a resonant frequency when said switch and said contact are open.

11. The circuit of claim 5, wherein said circuit is configured so that said contact opens when there is a loss of supply power and further wherein said circuit is configured so that a voltage across said relay inductor coil is greater when said relay contact and said control switch are open than when said switch is closed and said contact is open, and wherein a pull-in voltage of said relay coil is established between a maximum and minimum value of said inductor coil voltage.

12. The circuit of claim 1, wherein said circuit is configured so that said contact opens when there is a loss of supply power.

13. The circuit of claim 1, wherein said circuit includes a single capacitor.

14. The circuit of claim 1, wherein said circuit is devoid of a diode.

15. The circuit of claim 1, wherein said circuit is devoid of a transistor.

16. The circuit of claim 1, wherein said circuit receives a supply voltage across a first node defined between said capacitor and said relay contact, and a second node defined between said equipment load and said inductor.

17. The circuit of claim 5, wherein said circuit includes a single capacitor.

18. The circuit of claim 5, wherein said circuit is devoid of a diode.

19. The circuit of claim 5, wherein said circuit is devoid of a transistor.

20. The circuit of claim 5, wherein said circuit receives a supply voltage across a first node defined between said capacitor and said relay contact, and a second node defined between said equipment load and said inductor.

21. An equipment load safety circuit comprising:
   a relay having an inductor coil and a relay contact, said relay contact controlling flow of current to said load;
   a switch controlling flow of current to said load; and
   a capacitor,
   wherein safety circuit is configured so that said inductor coil and said capacitor, when said relay contact and said switch are open, form a series-connected LC circuit having a resonant frequency of about a supply voltage frequency.

22. The circuit of claim 21, wherein said circuit is configured so that said relay contact open opens only when there is a loss of supply power.

23. The circuit of claim 21, wherein said circuit is configured so that said relay contact closes only when supply power is available and said relay contact and said switch are open.

24. The circuit of claim 21, wherein said circuit includes a single capacitor.

25. The circuit of claim 21, wherein said circuit is devoid of a diode.

26. The circuit of claim 21, wherein said circuit is devoid of a transistor.

27. The circuit of claim 21 wherein said circuit receives a supply voltage across a first node defined between said capacitor and said relay contact, and a second node defined between said equipment load and said inductor.

28. An equipment load safety circuit comprising:
   (A) a first circuit combination comprising a relay contact connected in parallel across a series-connected resistor and capacitor combination;
   (B) a second circuit combination comprising an inductor coil associated with said relay contact connected in parallel across a series connected switch and equipment load combination;
   wherein said first circuit combination is connected in series with said second circuit combination, and wherein said safety circuit is adapted to receive a supply voltage across said series connected first and second circuit combinations.

29. The circuit of claim 28, wherein said safety circuit is configured so that said relay contact open opens only when there is a loss of supply power.

30. The circuit of claim 28, wherein said safety circuit is configured so that said relay contact closes only when supply power is available and said relay contact and said switch are open.

31. The circuit of claim 28, wherein said safety circuit includes a single capacitor.

32. The circuit of claim 28, wherein said safety circuit is devoid of a diode.

33. The circuit of claim 28, wherein said safety circuit is devoid of a transistor.

34. The safety circuit of claim 28 configured so that, when said relay contact and said switch are open, said capacitor and said inductor coil define a series connected LC circuit having a resonant frequency approximately equal to a supply power frequency.

35. The circuit of claim 28, wherein said circuit receives a supply voltage across a first node defined between said capacitor and said relay contact, and a second node defined between said equipment load and said inductor.

36. An equipment load safety circuit comprising:
   a relay having an inductor coil and a relay contact, said relay contact controlling flow of current to said load;
   a switch controlling flow of current to said load; and
   a capacitor,
   wherein said safety circuit is configured so that:
      (A) when power is applied to said safety circuit while said relay contact is open and said switch is closed, current flows through said capacitor, said inductor coil and said equipment load;
      (B) when power is applied to said safety circuit while said relay contact is open and said switch is open, current flows through said capacitor and said inductor but not said equipment load.

37. The circuit of claim 36, wherein said circuit is configured so that said relay contact open opens only when there is a loss of supply power.

38. The circuit of claim 36, wherein said circuit is configured so that said relay contact closes only when supply power is available and said relay contact and said switch are open.

39. The circuit of claim 36, wherein said circuit includes a single capacitor.

40. The circuit of claim 36, wherein said circuit is devoid of a diode.

41. The circuit of claim 36, wherein said circuit is devoid of a transistor.

42. The safety circuit of claim 36, configured so that, when said relay contact and said switch are open, said capacitor and said inductor coil define a series connected LC circuit having a resonant frequency approximately equal to a supply power frequency.

43. The circuit of claim 36, wherein said circuit receives a supply voltage across a first node defined between said capacitor and said relay contact, and a second node defined between said equipment load and said inductor.

44. An equipment load safety circuit comprising:
a relay having an inductor coil and a relay contact, said relay contact controlling flow of current to said load;
a switch controlling flow of current to said load; and
a capacitor,
wherein said safety circuit is configured so that said inductor coil and said capacitor, when said relay contact and said switch are open, share a common current.

45. The circuit of claim 44, wherein said circuit is configured so that said relay contact open only when there is a loss of supply power.

46. The circuit of claim 44, wherein said circuit is configured so that said relay contact closes only when supply power is available and said relay contact and said switch are open.

47. The circuit of claim 44, wherein said circuit includes a single capacitor.

48. The circuit of claim 44, wherein said circuit is devoid of a diode.

49. The circuit of claim 44, wherein said circuit is devoid of a transistor.

50. The safety circuit of claim 44, configured so that, when said relay contact and said switch are open, said capacitor and said inductor coil define a series connected LC circuit having a resonant frequency approximately equal to a supply power frequency.

51. The circuit of claim 44, wherein said circuit receives a supply voltage across a first node defined between said capacitor and said relay contact, and a second node defined between said equipment load and said inductor.

* * * * *